Sept. 19, 1939.    P. M. MILLER ET AL    2,173,591
BRAKE DRUM
Filed April 29, 1936    3 Sheets-Sheet 2

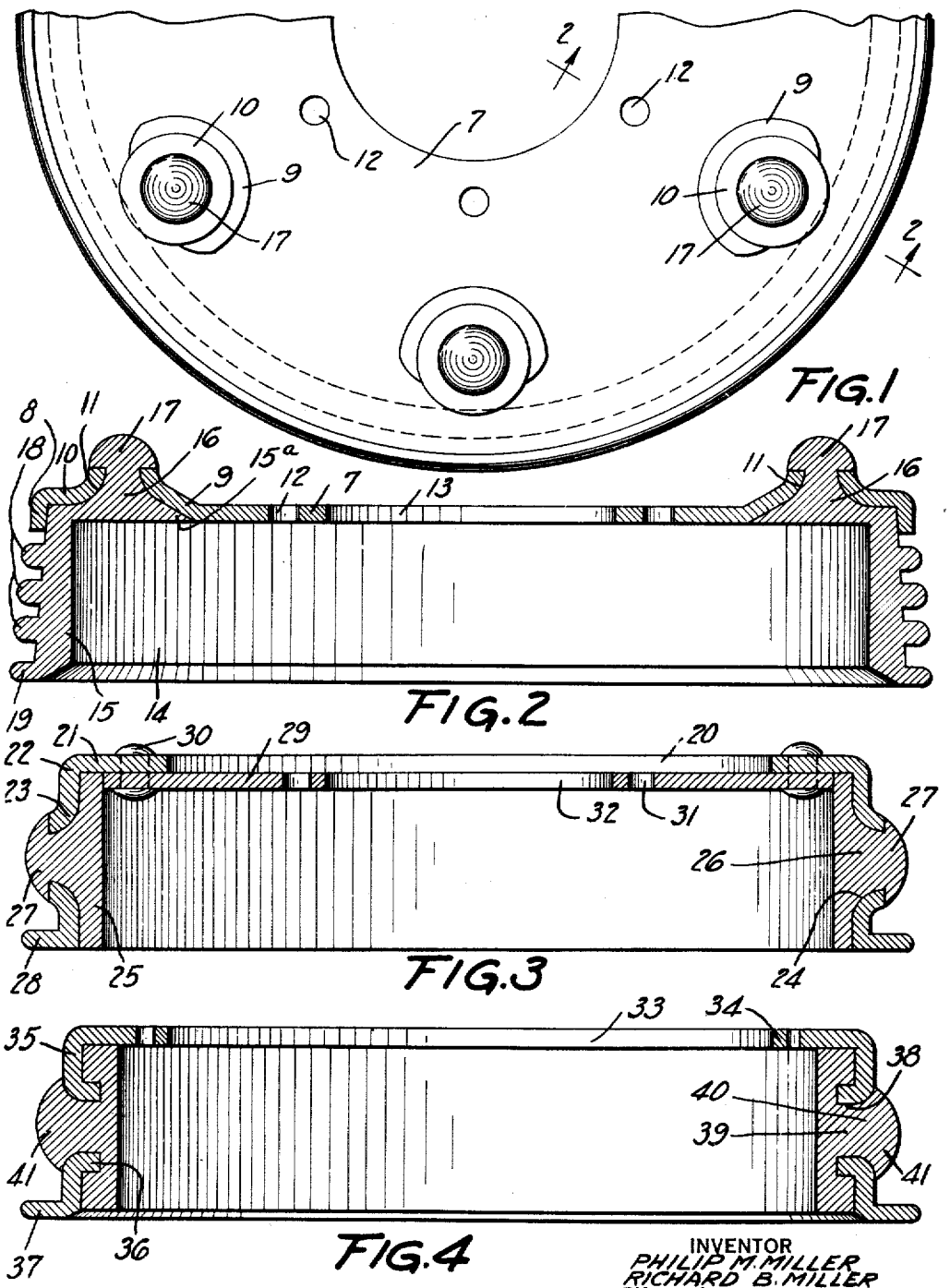

INVENTOR
PHILIP M. MILLER
RICHARD B. MILLER
BY
A. B. Wilson
ATTORNEY

Sept. 19, 1939.   P. M. MILLER ET AL   2,173,591
BRAKE DRUM
Filed April 29, 1936   3 Sheets-Sheet 3

INVENTOR
PHILIP M. MILLER
RICHARD B. MILLER
BY
*A. E. Wilson*
ATTORNEY

Patented Sept. 19, 1939

2,173,591

UNITED STATES PATENT OFFICE 2,173,591

BRAKE DRUM

Philip M. Miller and Richard B. Miller, Brooklyn, N. Y., assignors to Bendix Products Corporation, South Bend, Ind., a corporation of Indiana Application April 29, 1936, Serial No. 76,880

11 Claims. (Cl. 188—218)

This invention relates to brake drums, and more particularly to the manufacture of brake drums adapted for light and heavy duty speedy automotive vehicles and other operating equipment.

On account of the increased speed of the present motor driven vehicles and greatly increased traffic on the road, the present steel brake drums employed with the vehicles are inefficient owing to the characteristics of the metal, which render the wheel incapable to withstand the frictional heat generated therein by periodical contact of the brake drum with braking mechanism of the vehicle, while checking the movement of the latter, and therefore better braking facilities on automotive vehicles are required.

The principal object of our invention is to provide a construction having a brake engaging member of material other than sheet steel metal cast on and fused with the material of the latter to form a rigid brake drum having efficient heat transferring means embodied in the peripheral face of the brake engaging member, resulting in cool brake constructions, since the main body of the wheel is made of sheet metal of light construction.

The present invention is an improvement over the brake drum constructions disclosed in our pending applications Serial Nos. 561,180 and 565,331, filed September 4, 1931, and September 26, 1931, respectively.

One of the essential features of the invention is to provide a brake drum comprising a sheared, pressed or stamped steel sheet metal body, and a cast brake engaging member fused thereon to form a rigid, light, strong, economical construction, the brake engaging member having desirable high wear resisting characteristics, such as a cast iron mixture of a special composition cast on the steel sheet metal body in any suitable manner.

Other objects and advantages of our invention will be apparent from the following detailed description considered in connection with the accompanying drawings, wherein:

Figure 1 is an outboard side elevational view of a fragmentary portion of a brake drum construction in which the brake engaging member is of good braking material, such as a cast iron mixture having engagement with the periphery of a sheet metal body to form a rigid engagement therewith;

Figure 2 is a cross section of Figure 1 taken on the line 2—2, as indicated by the arrows;

Figure 3 is a cross sectional view of a brake drum construction embodying a modified form of the invention;

Figure 4 is a view similar to Figure 3, showing a further modified form of the invention;

Figure 7:
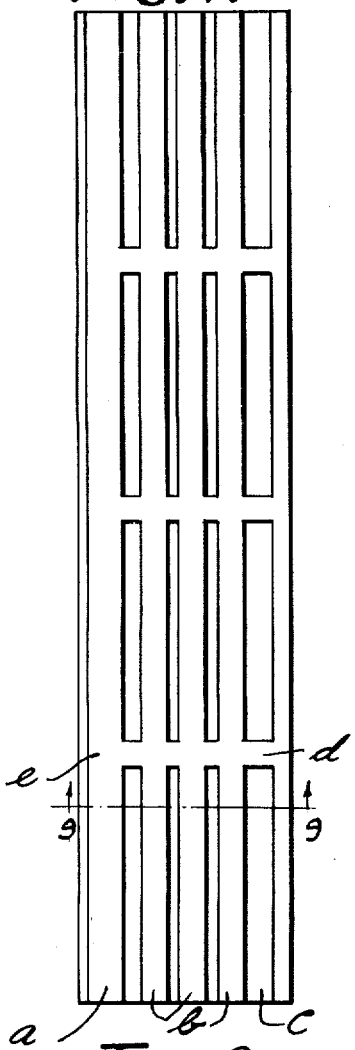
Figure 7 is a plan view of circumferential and transverse ribs enmeshed one with another.
Figure 8:
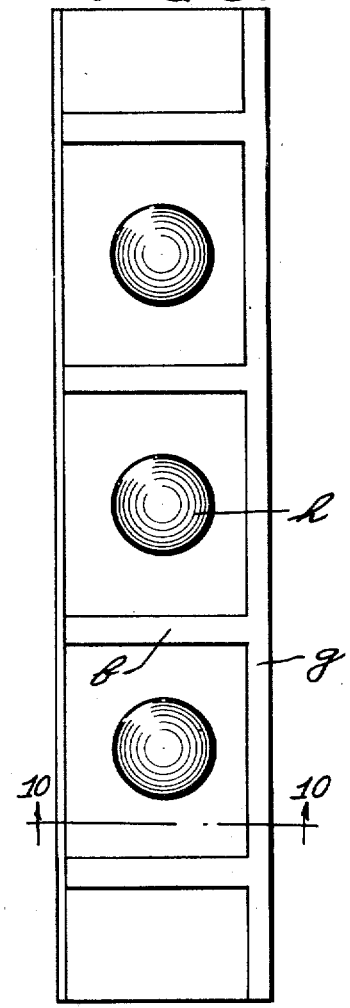
Figure 9:
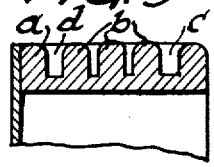
Figure 10:
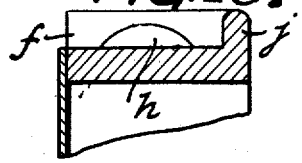

Figure 8 is a view similar to Figure 7, showing transverse ribs formed integral with the side thereof; and Figures 9 and 10 are sectional views taken on line 9—9 and 10—10 of Figures 7 and 8, respectively.

Referring to Figures 1 and 2, wherein like reference numbers refer to corresponding parts, the brake drum body comprises a centrally pressed sheet metal disk 7 formed with an annular transversely extending inward flange 8, a series of laterally outwardly pressed necks 9 and 10 in the centrally pressed disk 7 adjacent to the flange 8, each having a bore 11, a series of bolt receiving openings 12 and a central opening 13. A cast cylindrical member 14 is fused on the inner surface of the disk 7 in a manner such that the cast material of a radial flange 15a is annularly fused on the inboard face thereof, forming necks 16 in the bores 11 of the necks 9 and 10 and a head 17 engaging with the outermost portion of the laterally pressed necks 9 and 10, by means of which the cylindrical member 14 is rigidly fastened with the disk member 7 to constitute a rigid brake drum construction. The peripheral face of the cylindrical member is formed with circumferential beads or fins 18 and a circumferential flange 19 adapted to strengthen the construction and dissipate generated heat therein.

As is obvious, the sturdy necks 16 form means whereby the cast material is rigidly held in engagement with the sheet metal body, and the heads 17 bind the parts together to resist the expanding force applied to a flange 15 by the braking mechanism of the vehicle when stopping the movement thereof. The fins or beads 18 and flange 19 dissipate the heat generated therein by frictional contact of the braking mechanism, and the fins or ribs and the flange, in conjunction with the transverse body 8 of the disk, supply the desired rigidity and strength to the whole construction. Because of the formation of the sturdy necks 9 and 10 of the disk body and the sturdy necks 16 and head 17 of the cast body in connection with the annular laterally inward body 8, a strong brake drum head is provided, capable of withstanding excessive strain imposed thereon by the periodical engagement with the braking mechanism of the vehicle.

In Figure 3 a construction is shown which comprises an annular sheet metal member 20 formed in cross section with a relatively short attaching flange 21 and a transversely extending inward body 22 having a series of radially outwardly pressed necks 23, each provided with a bore or opening 24. In the inner face of the transverse flange or body 22 a brake engaging member 25 is cast, the material of which is flowed through the openings 24 to form a neck 26 in each opening and a head 27 on the outer face thereof, to lock the sheet metal member with the cast metal member forming a rigid annular brake engaging head. To materially reinforce the annular head the transverse flange 22 is provided with an inboard side flange 28, thereby forming a rigid brake drum head. As a means of completing the modified brake drum construction, a disk 29 is fastened to the radial flange 21 by rivets 30, as shown, to form a unitary construction. The central part of the disk is provided with bolt receiving openings 31 and a central opening 32.

In Figure 4 a brake drum construction is shown which comprises an annular member 33 provided in cross section with a radial flange 34 and a transversely extending inwardly disposed flange 35 having circumferentially and radially inwardly pressed-in necks 36, each having an opening 38 therein. A radial flange 37, carried by the annular member 33 acts to strengthen or rigidify the structure. A brake engaging member 39 is cast or molded on the inner face of the flange 35, the cast material having been flowed through each of the openings, as shown at 40, to form a head 41 on the outer face thereof to bind the cast member to the sheet metal member, forming a rigid brake drum head.

In connection with the brake drum heads hereinbefore described in connection with Figures 3 and 4, the sheet metal is fused with the cast metal to obtain rigidity therebetween, the cast material forming necks 26 and 40 and heads 27 and 41 to prevent separation of the cast material from the sheet metal and reenforce the connection therebetween. The necks extend over a large area on the outer peripheral face of the sheet metal transverse flanges to form means whereby the heat generated in the respective brake drum heads is dissipated rapidly. This construction provides a strong brake drum which will dissipate the generated heat rapidly.

Figures 5, 6:
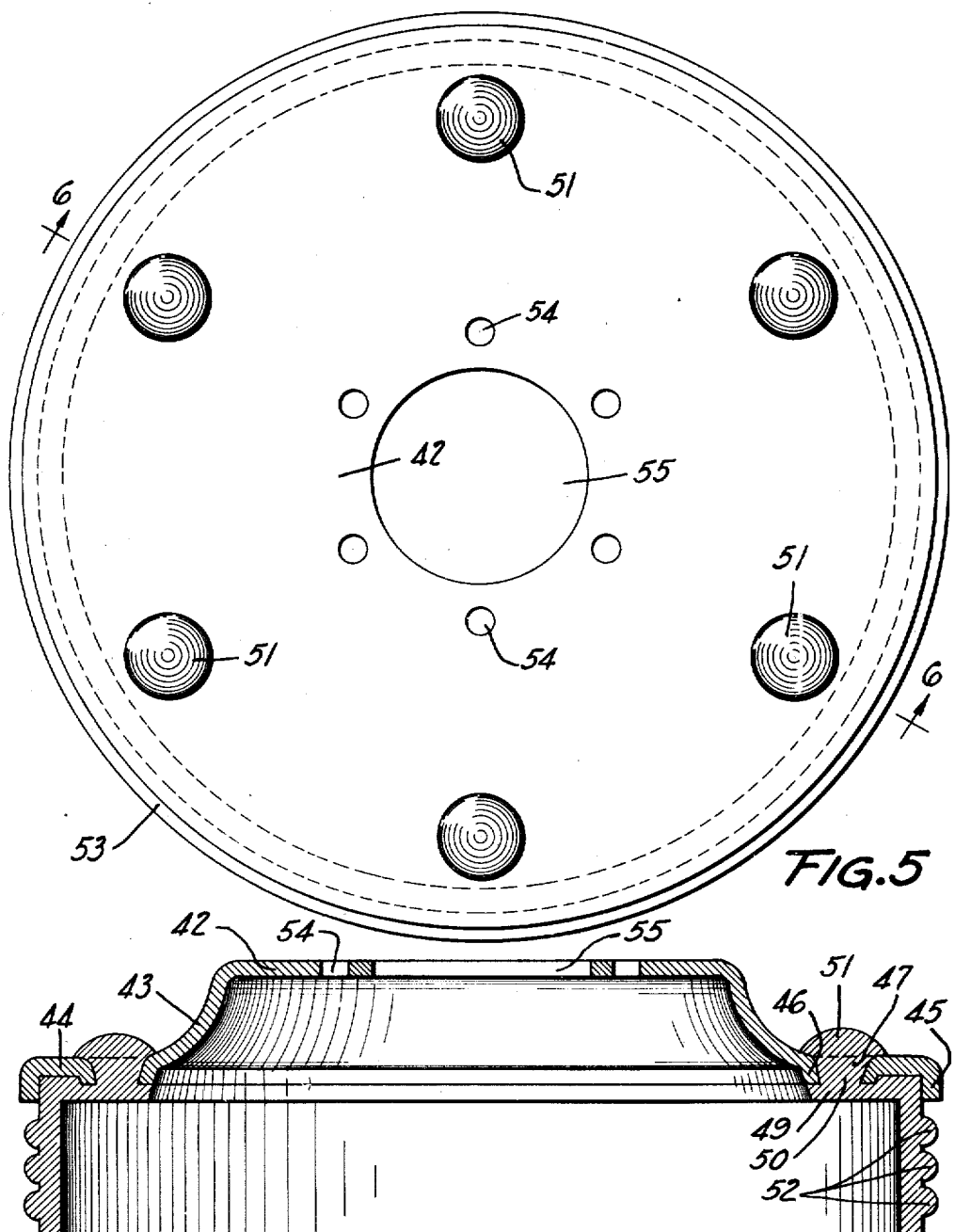
Figure 5 is a view similar to Figure 1, showing another modified form of the invention.
Figure 6 is a sectional view taken on the line 6—6 of Figure 5.

Referring to Figures 5 and 6, there is shown a modified form of the invention wherein a disk member is provided with a deep central chamber 42 formed integral with a radially outward laterally curved wall 43, which extends into a radially outward wall 44 having peripherally disposed a laterally inwardly extending flange 45. A series of laterally inwardly pressed necks 46, each having an opening 47, are formed in the wall 44. A brake engaging member, having in cross section a laterally inwardly extending flange 48 and a radially inwardly extending flange 49, is cast on the inboard face of the wall 44. The material is flowed through each of the openings 47, as shown at 50, to form a head 51 engaging with the outboard face of the wall 44, thereby binding the cast metal with the sheet metal to provide a strong and rigid brake drum construction. For strengthening the head of the brake drum, a plurality of ribs or fins 52 and 53 are circumferentially formed on the peripheral face of the transverse flange 48 to assist in dissipating the heat generated therein. The central portion of the disk is provided with a plurality of bolt receiving openings 54 and a central opening 55.

In connection with the constructions shown in Figures 1, 2, 5 and 6, the cast members 15, 15a, 16, 17, 18, 19, 48, 49, 50, 51, 52 and 53 are strong and durable and capable of withstanding the frictional heat generated during braking contact. The brake engaging flanges are easy to machine, and the laterally inwardly extending flanges 8 and 45 of the disk members 7 and 42 contribute reenforcement to the respective cast members associated with the inboard face of the peripheral portion of the disks 7 and 42. The heads 17 and 51 in the openings 11 and 47 form a strong, light brake drum which is economical to manufacture.

The constructions shown in Figures 2 and 6, as is obvious, embody efficient means to withstand torsional strains and to rapidly dissipate frictional heat generated therein by contact with braking mechanism. The particular drawing of the necks 10, 11, 23, 36 and 47, the openings of which are fused with material of the brake engaging members and covered with heads of the material cast therethrough to form locks, constitute means by which the cast material of the brake engaging members is in rigid engagement with the sheet material of the disks.

The brake engaging members of the drum constructions may be molded on the heads of the disks in any desired manner, such as casting or centrifugally spinning the molten metal, to fuse both the sheet metal with the cast metal in the manner of forming a union therebetween.

It will be understood, of course, that for the purpose of increasing the strength of the brake drum constructions we may provide additional ribs or fins, as shown in Figure 7, transversely of each brake engaging member, on the peripheral face thereof, to interfuse with the circumferential ribs or fins 18 and 52, and provide transverse ribs or fins, on the peripheral face of each brake engaging sheet metal member between the heads 27 and 41, to form heat radiating means, as shown in Figure 8.

As clearly shown in Figures 7 and 8, the peripheral surfaces of the brake drums may be formed with any suitable ribs or fins, but preferably with ribs or fins as arranged thereon. In Figure 7 spaced circumferential ribs or fins, parallel with the peripheral flange *a* of the sheet metal member of the drum, are intermeshed with transverse ribs or fins *d*, which in turn continue into fusing engagement with the sheet metal flange *a* to hold the latter in normal alignment and the entire peripheral head of the brake drum in rigid position with reference to the radial alignment of the sheet metal member. The axially outward ends of the transverse ribs or fins *d* are fused at *e* on the peripheral flange of the sheet metal wall *a* for the purpose of preventing distortion of the latter in shrinking operation of both the sheet metal and cast iron mixture, after the same are completed and subjected to a cooling process normally practiced at foundries.

In Figure 8 the peripheral face of the brake drum is shown to be formed with transverse ribs or fins *f* fused on the radial flange *g*. As is obvious, the particular arrangement of the fins or ribs in network constitutes means whereby a wide dissipating area is formed on the peripheral face of the brake drums.

Coincidentally with the constructing of the laterally outwardly drawn necks 10 and 11 and the laterally extended heads 17, and the drawing laterally outwardly of the cup-shaped central portion 42, we provide means for mounting wheels thereon, the details of which are not disclosed herein.

While we have shown and described certain features as constituting our invention, it will be understood that parts have been shown for the purpose of illustration only, and that we do not desire to be limited to such details, as obvious modifications, variations and substitutions will occur to those skilled in the art.

We claim:

1. A brake drum comprising a pressed annular disk member, a brake engaging member cast on the disk member, and drawn necks each having an opening in the disk member, the material of the brake engaging member being different than the material of the disk member and flowed through the openings and forming heads, thereby binding the parts together.

2. A brake drum comprising a centrally pressed disk member of sheet material, a cast brake engaging member of different material than the disk member fastened to the disk member, pressed portions having engaging means provided in the latter member, the material of the cast brake engaging member engaging with the pressed portions to bind the parts together, and heat radiating means on the periphery of the brake drum formed of the material of the brake engaging member.

3. A brake drum comprising a transverse body formed with a laterally inwardly extending peripheral flange having outward necks, and a brake engaging member fused on the inner surface of the transverse body.

4. A brake drum comprising a radial member formed with outward projections and a peripheral flange, and a brake engaging member fused on the inner face of the peripheral portion of the radial member to form an integral joint with the projections and flange thereof.

5. A brake drum comprising a radial member having engaging projections and an engaging peripheral flange, and a brake engaging member fused on the projections and peripheral flange of the radial member to form an integral union.

6. A brake drum comprising a radial member formed with projections and a transverse peripheral flange, and a brake engaging member cast on the projections and transverse peripheral flange of the radial member to form an integral union therebetween, and heat dissipating means on the outer face of the brake engaging member.

7. A brake drum comprising a peripheral portion formed with projections and a flange having a radial wall, and a brake engaging member comprising an engaging face fused on the peripheral portion to form an integral engagement with the projections and flange of the radial wall of the peripheral portion and forming heat radiating means on the outer face of the brake engaging member.

8. A brake drum comprising a radial member having a peripheral flange and projections, and a brake engaging member of different material than the radial member fused on the inner face of the radial member and forming heat dissipating means thereon.

9. A brake drum comprising a radial sheet metal member having a peripheral flange and openings in the radial portion of the member, a brake engaging member of different material fused on the peripheral flange and flowed through the openings of the radial portion thereof and forming outer fastening means on the latter, and heat dissipating means on the brake engaging member.

10. A brake drum comprising a radial sheet metal annular member having a peripheral flange and openings in the radial portion of the member, a brake engaging member of different material cast on the periphery of the radial sheet metal member and flowed through the openings to form binding means with the sheet metal material of the radial member, and heat dissipating means formed on the outer face of the brake engaging member.

11. A brake drum comprising a brake engaging member having openings in its radial portion and a transverse flange, including a brake engaging face of material different than the material of the transverse flange, the material of the brake engaging face being cast on the material of the brake engaging member and flowed through said openings to bind them together, heat dissipating means formed on the outer face of the brake engaging member when the brake engaging material is cast, and a radial wall extending from the brake engaging member to complete the brake drum.

PHILIP M. MILLER.
RICHARD B. MILLER.

CERTIFICATE OF CORRECTION.

Patent No. 2,173,591.        September 19, 1939.

PHILIP M. MILLER, ET AL.

It is hereby certified that error appears in the printed specification of the above numbered patent requiring correction as follows: Page 2, sec- one column, line 22, for "Figures 2 and 6" read --Figures 2 to 6--; and that the said Letters Patent should be read with this correction therein that the same may conform to the record of the case in the Patent Office.

Signed and sealed this 27th day of August, A. D. 1940.

(Seal)               Henry Van Arsdale,
                 Acting Commissioner of Patents.

or ribs in network constitutes means whereby a wide dissipating area is formed on the peripheral face of the brake drums.

Coincidentally with the constructing of the laterally outwardly drawn necks 10 and 11 and the laterally extended heads 17, and the drawing laterally outwardly of the cup-shaped central portion 42, we provide means for mounting wheels thereon, the details of which are not disclosed herein.

While we have shown and described certain features as constituting our invention, it will be understood that parts have been shown for the purpose of illustration only, and that we do not desire to be limited to such details, as obvious modifications, variations and substitutions will occur to those skilled in the art.

We claim:

1. A brake drum comprising a pressed annular disk member, a brake engaging member cast on the disk member, and drawn necks each having an opening in the disk member, the material of the brake engaging member being different than the material of the disk member and flowed through the openings and forming heads, thereby binding the parts together.

2. A brake drum comprising a centrally pressed disk member of sheet material, a cast brake engaging member of different material than the disk member fastened to the disk member, pressed portions having engaging means provided in the latter member, the material of the cast brake engaging member engaging with the pressed portions to bind the parts together, and heat radiating means on the periphery of the brake drum formed of the material of the brake engaging member.

3. A brake drum comprising a transverse body formed with a laterally inwardly extending peripheral flange having outward necks, and a brake engaging member fused on the inner surface of the transverse body.

4. A brake drum comprising a radial member formed with outward projections and a peripheral flange, and a brake engaging member fused on the inner face of the peripheral portion of the radial member to form an integral joint with the projections and flange thereof.

5. A brake drum comprising a radial member having engaging projections and an engaging peripheral flange, and a brake engaging member fused on the projections and peripheral flange of the radial member to form an integral union.

6. A brake drum comprising a radial member formed with projections and a transverse peripheral flange, and a brake engaging member cast on the projections and transverse peripheral flange of the radial member to form an integral union therebetween, and heat dissipating means on the outer face of the brake engaging member.

7. A brake drum comprising a peripheral portion formed with projections and a flange having a radial wall, and a brake engaging member comprising an engaging face fused on the peripheral portion to form an integral engagement with the projections and flange of the radial wall of the peripheral portion and forming heat radiating means on the outer face of the brake engaging member.

8. A brake drum comprising a radial member having a peripheral flange and projections, and a brake engaging member of different material than the radial member fused on the inner face of the radial member and forming heat dissipating means thereon.

9. A brake drum comprising a radial sheet metal member having a peripheral flange and openings in the radial portion of the member, a brake engaging member of different material fused on the peripheral flange and flowed through the openings of the radial portion thereof and forming outer fastening means on the latter, and heat dissipating means on the brake engaging member.

10. A brake drum comprising a radial sheet metal annular member having a peripheral flange and openings in the radial portion of the member, a brake engaging member of different material cast on the periphery of the radial sheet metal member and flowed through the openings to form binding means with the sheet metal material of the radial member, and heat dissipating means formed on the outer face of the brake engaging member.

11. A brake drum comprising a brake engaging member having openings in its radial portion and a transverse flange, including a brake engaging face of material different than the material of the transverse flange, the material of the brake engaging face being cast on the material of the brake engaging member and flowed through said openings to bind them together, heat dissipating means formed on the outer face of the brake engaging member when the brake engaging material is cast, and a radial wall extending from the brake engaging member to complete the brake drum.

PHILIP M. MILLER.
RICHARD B. MILLER.

CERTIFICATE OF CORRECTION.

Patent No. 2,173,591. September 19, 1939.

PHILIP M. MILLER, ET AL.

It is hereby certified that error appears in the printed specification of the above numbered patent requiring correction as follows: Page 2, sec- one column, line 22, for "Figures 2 and 6" read --Figures 2 to 6--; and that the said Letters Patent should be read with this correction therein that the same may conform to the record of the case in the Patent Office.

Signed and sealed this 27th day of August, A. D. 1940.

(Seal)

Henry Van Arsdale,
Acting Commissioner of Patents.